Patented Jan. 17, 1939

2,143,903

UNITED STATES PATENT OFFICE 2,143,903

DRIED FRUIT PROCESS

Paul C. Wilbur, San Jose, Calif.

No Drawing. Application July 13, 1937,
Serial No. 153,364

9 Claims. (Cl. 99—104)

This invention relates to the treatment of dried fruit, such as prunes and the like, prior to the packing thereof in containers such as cartons, cans, boxes, etc., and is concerned more particularly with the provision of a treating process which produces a product of improved edibility, appearance, and resistance to spoilage.

One of the most important problems in treating dried fruits lies in the obtaining of a soft, edible fruit of the desired moisture content. Heretofore, in the ordinary art of preparing dried fruits such as prunes and the like for packaging, the desired end has been sought by immersing the fruits in water at or somewhat below the boiling point, or in steam or water vapor at or somewhat below the boiling point, until the fruit has absorbed the desired quantity of moisture. In this process, the moisture content is determined by the time of immersion, the temperature of the water or vapor, and by the original size and condition of the fruit. During the immersion, the temperature and moisture content of the fruit gradually increase, resulting in increased softness thereof. It will be noted that the final maximum temperature which can be obtained practically within the fruit is limited by the length of time the fruit may be subjected to the water or steam vapor without absorbing undesirably large quantities of water. In any case, the temperature of the fruit cannot exceed the temperature of boiling water, i. e., 212° F., since that temperature is the maximum employed in the heating medium, so that the improvement of the product from the effect of temperature has been definitely limited. It is also well known that increasing degrees of softness may be produced in dried fruits by increasing the time of immersion in the water or steam vapor as noted above. However, this increase in softness is accompanied by an undue increase in moisture content, and an increasing susceptibility of the product to the growth of mold, yeast and other forms of deterioration. For example, a moisture content of 23 to 27% by weight depending on the composition of fruit, the desired storage life and method of storage, is ordinarily regarded as the maximum commercial limit for prunes in containers, and any method which produces a moisture content in excess of this maximum will result in undesirable conditions in the prunes packed in the containers. Consequently, prunes treated by conventional methods have not had the desired softness and edibility, and it has always been considered necessary to sacrifice these desirable qualities to a large extent in order to keep the moisture content below the permissible maximum.

I have found that a greatly improved product can be obtained by controlling the moisture content of the prune and by subjecting the prune to desired temperature conditions at the various stages in the preparation for and during packaging, to obtain an unusually high degree of softness as well as an improved appearance, while at the same time maintaining the moisture content sufficiently low to provide the desired resistance to spoilage after packaging.

It is a general object of the invention, therefore, to provide an improved process for treating dried fruits such as prunes and the like, which results in a better product than has heretofore been obtained.

Another general object of my invention lies in the provision of a dried fruit such as a prune of a high degree of softness and of a more attractive appearance.

It is another object of my invention to provide an improved process for treating prunes and the like, which produces a more edible and attractive product than heretofore produced.

Another object of my invention is to provide an improved process by means of which dried fruits, such as prunes and the like, are subjected to temperatures which produce the desired degree of softness in the fruit, without causing an excessive moisture content.

Another object of my invention is to provide an improved prune or the like having the desired degree of softness without excessive moisture content and having an attractive appearance.

Other objects of the invention will be apparent from the following description of a preferred method of carrying out the invention.

Generally, the process of my invention may consist first, in treatment of the fruit to provide substantially the desired quantity of moisture therein; second, treatment of the fruit to enhance the softness and edibility thereof while retaining the desired moisture content; and third, the regulation of the temperature of the fruit immediately after filling into the container so as to insure proper pasteurization without overheating or irregular heating. The last mentioned step may be omitted under certain conditions as outlined hereinafter.

In carrying out the initial step of my process, the fruit to be treated is immersed in a bath of water or steam vapor at the boiling temperature and preferably at atmospheric pressure, or at any degree below boiling temperature, for a sufficient length of time to permit imbibition of the desired quantity of moisture. As noted above, the length and temperature of this immersion depends upon the size, moisture content, and the condition of the fruit being treated, but under normal conditions the length of time will be within the range of from 3 to 6 minutes inclusive. Usually, with small fruit, this preliminary treatment may be accomplished at the boiling temperature because of the relative thickness of the flesh of the fruit being treated. With larger fruits it is frequently desirable to immerse them in water for a longer period of time at a lower temperature to permit absorption of the desired quantity of water without extraction of considerable amounts of soluble matter, which would be dissolved by immersion for the necessary time at the temperature of boiling water. The time of immersion required to absorb the desired amount of water depends on the temperature. For example, with a particular type of prunes which require three minutes in boiling water to absorb the desired degree of moisture, immersion for about six minutes in water at 180° F. or about 12 to 15 minutes in water at 140° F. is required to cause imbibition of the same amount of water. It will be understood that this relationship varies somewhat with different types, grades and sizes of prunes.

After the above pre-treatment in water or steam vapor, at or below the boiling temperature, the fruit may be subjected to any suitable apparatus, such as a shaker or blower, to remove the clinging surface water which has not been absorbed. This step is desirable, though not essential, to facilitate the proper control of the moisture content of the fruit in the treatment step about to be described.

After the excess water has been removed, the fruit is subjected to a temperature in excess of 212° F. in the presence of moisture, i. e. in an atmosphere of substantially stable moisture content, to effect softening thereof while retaining the desired moisture content. This treatment may preferably be effected by placing the fruit in a closed chamber or retort in which it is subjected to dry saturated or slightly superheated (i. e., one or two degrees of superheat) steam under pressure for a length of time and at a pressure which may be required to give the desired softness to the product. With prunes, the best results have been obtained with a treatment for three minutes at a temperature of 240° F. (10 lbs. gauge pressure), although improved results can be obtained at temperatures from 220° F. (2.5 lbs. gauge pressure) to 260° F. (20.7 lbs. gauge pressure) by appropriate adjustment of the time between two and six minutes. It will be understood that for the higher temperatures the times will be less, and vice versa, to obtain the desired results. I have found that temperatures substantially above 260° F. will result in too rapid cooking of the outer part of the flesh of the fruit so that uniform treatment is difficult to obtain.

During this step very small quantities of additional moisture are absorbed by the fruit, and higher temperature is obtained within the fruit than that which would be obtained by immersion of the fruit in boiling water for the same length of time. During this treatment a marked change occurs in the flesh of the fruit by virtue of the elevated temperature and pressure, which results in a much greater degree of softness than can be obtained in fruits of the same moisture content by immersion in boiling water or steam vapor at or near the boiling point. This treatment also results in a changed appearance of the skin of the fruit which is provided with a gloss not obtainable in prior methods of treatment. The above changes probably result from a breaking down of certain of the pectinous or gummy constituents of the flesh and skin of the fruit.

The above described method of subjecting the fruit to temperatures in excess of the boiling point in the presence of moisture result in delivering the treated dried fruit to the packaging equipment at a temperature greatly in excess of that which obtains in the processes in use at present, with a high degree of softness, yet with a moisture content maintained below the point at which spoilage will readily occur by the growth of yeasts, molds or other spoilage organisms. Also, the additional heat of the treated fruit at the time of packaging may be used, when desirable, to obtain a high temperature within the container after closure, causing more complete destruction of molds, yeasts, and other spoilage organisms on the product and in the container at the time of packing, than is possible with the processes in use at present. Also, a further cooking and softening action occurs in the container by reason of this additional heat, which causes a further desirable softening of the product.

With some methods of packaging a further step consisting of substantially uniform controlled cooling of the packaged fruit gives an added improved result. Containers packed with dried fruit at a higher temperature by reason of the treatment outlined above, when packed into larger unit packages for storage in the warehouse or for shipment, lose heat at an irregular rate depending on the position of the individual container within the larger package. Thus, containers at or near the center of the larger package will lose heat more slowly than those containers near or at the outer edges by reason of the greater thickness of matter through which heat must travel to escape. Even in the small containers the outer portions of the container decrease in temperature more rapidly than the inner portions. It is well known that the destruction of molds, yeasts, and other spoilage organisms is determined by the time and the temperature, thus at an elevated temperature the destruction will be more rapid than at a lower temperature. In order to maintain the heat within the package long enough to destroy the yeasts, molds, and other spoilage organisms therein, and later to cool the packages at a uniform rate in such a manner that recontamination will not occur, the containers may be subjected to a cooling operation in the form of a preliminary holding at a pasteurizing temperature and a final cooling to room temperature as will now be described.

The cooling may preferably be effected in a sectional cooling chamber of suitable construction, in the first section of which the containers will be held from 3 to 10 minutes in air at a temperature above the temperature of the room and preferably at 160° F. to 190° F., by means of steam coils or other heating means. The temperature of the air should not be high enough to cause any material increase in temperature of the fruit within the package but sufficiently high to prevent any unduly rapid loss of temperature at the surfaces of the container during the period it is within the first section of the cooling chamber. In this manner a substantially uniform temperature condition is maintained within the package and at its surface by delaying the ordinary drop in temperature which would otherwise occur at the surface of the package.

After the above described pasteurizing step which is preliminary to cooling of the packages to ordinary temperature, the packages are conveyed through another section of the cooling chamber in which they are subjected to the cooling action of a current of air, which is preferably filtered so as to be free from organisms which might cause slow decomposition of the product if they should enter the container during the cooling period. Preferably, the filtered air is directed into the final cooling section at or near the point of exit for the cooling containers and is drawn from such section at or near the point of entrance of the containers being cooled. In this manner, the direction of circulation of the current of cooling air is opposite to the direction of movement of the containers being cooled whereby each container will be cooled at a substantially uniform rate, and as any container passes a particular location in the cooling chamber, it is subjected to cooling air of a substantially definite temperature.

While I have described my invention as carried out by a preferred method of obtaining the improved product, and as particularly useful in connection with the processing of prunes, it is to be understood that the method is capable of modification and variation without departing from the spirit thereof, and that the scope of my invention, therefore, should be limited only by the proper scope and interpretation of the appended claims.

I, therefore, claim as my invention:

1. A method of treating dried prunes, which includes the steps of subjecting fruit having substantially the desired moisture content and no mechanically removable surface moisture to a temperature above 212° F. in an atmosphere of water vapor under pressure, packaging the fruit, effecting a preliminary holding of the packaged fruit at a temperature at or above 160° F. and not higher than the highest temperature existant in the fruit to pasteurize the package, and then cooling the packaged fruit at a substantially uniform rate.

2. A method of treating dried prunes, which includes the steps of subjecting fruit having substantially the desired moisture content and no mechanically removable surface moisture to a temperature above 212° F. in an atmosphere of water vapor under pressure, packaging the fruit, effecting a preliminary holding of the packaged fruit at a temperature at or above 160° F. and not higher than the highest temperature existant in the fruit to pasteurize the package, and then cooling the packaged fruit at a substantially uniform rate by moving the packaged fruit through a cooling chamber and circulating a current of cooling medium through the chamber in a direction opposite to the direction of movement of the fruit.

3. A method of conditioning dried prunes for packaging, comprising subjecting the fruit to moisture at a temperature not in excess of the boiling temperature of water, removing substantially all mechanically removable surface water, and then heating the fruit in steam free from entrained or unvaporized moisture and at least at atmospheric pressure.

4. A method of conditioning dried prunes for packaging, comprising subjecting the fruit to moisture at a temperature not in excess of the boiling temperature of water, removing substantially all mechanically removable surface water, and then heating the fruit in dry saturated steam at least at atmospheric pressure.

5. A method of conditioning dried prunes for packaging, comprising subjecting the fruit to moisture at a temperature not in excess of the boiling temperature of water, removing substantially all mechanically removable surface water, and then heating the fruit in slightly superheated steam at least at atmospheric pressure.

6. A method of conditioning dried prunes for packaging, comprising subjecting the fruit to moisture at a temperature not in excess of the boiling temperature of water, removing substantially all mechanically removable surface water, and then heating the fruit in steam free from entrained or unvaporized moisture and at least at atmospheric pressure and at a temperature between 220° F. to 260° F. inclusive.

7. A method of treating dried prunes, which includes the steps of subjecting fruit having substantially the desired moisture content and no mechanically removable surface water to water vapor under pressure at a temperature between 220° F. to 260° F., packaging the fruit while still heated, effecting a preliminary holding of the packaged fruit in air heated to a temperature between 160° F. and 190° F. to pasteurize the package, and then cooling the packaged fruit at a substantially uniform rate.

8. A method of treating dried prunes, comprising immersing the fruit in water at a temperature not in excess of 212° F. to effect absorption by the fruit of substantially the desired amount of moisture, removing excess moisture from the surface of the fruit, and subjecting the fruit to a temperature above 212° F. in an atmosphere of water vapor under pressure to soften the fruit without substantially changing the moisture content thereof.

9. A method of treating dried prunes, comprising immersing the fruit in water at a temperature not in excess of 212° F. to effect absorption by the fruit of substantially the desired amount of moisture, removing excess moisture from the surface of the fruit, and subjecting the fruit to dry saturated steam under pressure at a temperature between 220° F. to 260° F. inclusive.

PAUL C. WILBUR.